(12) United States Patent
Warren

(10) Patent No.: US 6,934,697 B1
(45) Date of Patent: Aug. 23, 2005

(54) CREATING CUSTOMIZED INTERNET ACCESS CLIENT USER INTERFACE

(75) Inventor: Terry Warren, Santa Ana, CA (US)

(73) Assignee: NetZero, Inc., Woodland Hills, CA (US)

(*) Notice: Subject to any disclaimer, the term of this patent is extended or adjusted under 35 U.S.C. 154(b) by 707 days.

(21) Appl. No.: 09/632,318

(22) Filed: Aug. 4, 2000

(51) Int. Cl.[7] .............................................. G06F 17/30
(52) U.S. Cl. ..................... 707/1; 707/10; 707/104.1; 715/501.1; 715/513; 709/223; 709/246
(58) Field of Search .................... 707/1–10, 100–104.1, 707/200–206, 500.1, 501.1, 512–513, 107–109; 705/1–10, 705/26–27; 345/718–719, 727–728, 787; 725/43–46, 725/51–53; 709/203–205, 215–225, 227, 709/246; 715/501.1, 512–513

(56) References Cited

U.S. PATENT DOCUMENTS

| | | | |
|---|---|---|---|
| 5,019,963 A | 5/1991 | Alderson |
| 5,105,184 A | 4/1992 | Pirani |
| 5,319,455 A | 6/1994 | Hoarty |
| 5,347,632 A | 9/1994 | Filepp |
| 5,504,675 A | 4/1996 | Cragun |

(Continued)

FOREIGN PATENT DOCUMENTS

CA 2244002 7/1997

(Continued)

OTHER PUBLICATIONS

Saridakis, T et al. Customized remote execution of web agents, system sciences, 1998, proceedings of the third Hawaii International conference, 1998, pp 614-620 V7.*

C.Mic Bowman et al. Harvest: A scalable, customizable discovery and access system, technical report CU-CS-732-94, department of compuer sciences, University of colorado, Mar. 1995, pp. 1-29.*

(Continued)

*Primary Examiner*—Srirama Channavajjala
(74) *Attorney, Agent, or Firm*—SoCal IP Law Group; Steven C. Sereboff; Mark A. Goldstein

(57) ABSTRACT

A customized Internet access client user interface is described. A template defines the basic layout of the user interface, and is typically stored at the local device and changed only for a major user interface upgrade. The template has various slots designated for receiving program components, which are made up of program objects and corresponding program resources. Each time a local device establishes a session with the server, the server sends the program objects and resources to the local device with rules assigning the components to appropriate slots within the template. Both the program objects and the corresponding program resources are selected by the server based in part upon profile data associated with the local device or with individual user's of the local device. Some profile data is supplied by the user, and may include user preferences, demographics, and other personal data. Other profile data is derived from statistics gathered by the client application regarding the user's use of the client application. The profile data can be updated at the beginning of each session, or during, or at the end of the session. By selecting the program objects and resources based in part upon the profile data which the client application can supply each time an Internet session is established, the program objects and resources may be customized for each session of each independent local device connecting to the server.

42 Claims, 7 Drawing Sheets

U.S. PATENT DOCUMENTS

| | | | |
|---|---|---|---|
| 5,636,346 A | 6/1997 | Saxe | |
| 5,692,157 A * | 11/1997 | Williams | 709/246 |
| 5,717,923 A | 2/1998 | Dedrick | |
| 5,721,827 A | 2/1998 | Logan | |
| 5,721,908 A * | 2/1998 | Lagarde et al. | 707/10 |
| 5,724,521 A | 3/1998 | Dedrick | |
| 5,737,619 A * | 4/1998 | Judson | 707/500 |
| 5,740,549 A | 4/1998 | Reilly | |
| 5,761,662 A | 6/1998 | Dasan | |
| 5,768,521 A | 6/1998 | Dedrick | |
| 5,823,879 A | 10/1998 | Goldberg | |
| 5,848,396 A * | 12/1998 | Gerace | 705/10 |
| 5,913,040 A | 6/1999 | Rakavy | |
| 5,918,014 A | 6/1999 | Robinson | |
| 5,933,811 A | 8/1999 | Angles | |
| 5,987,480 A * | 11/1999 | Donohue et al. | 707/501.1 |
| 5,999,178 A * | 12/1999 | Hwang et al. | 345/787 |
| 6,009,410 A | 12/1999 | LeMole | |
| 6,026,368 A * | 2/2000 | Brown et al. | 705/14 |
| 6,052,732 A * | 4/2000 | Gosling | 709/229 |
| 6,085,229 A | 7/2000 | Newman | |
| 6,157,946 A | 12/2000 | Itakura | |
| 6,163,776 A * | 12/2000 | Periwal | 707/4 |
| 6,237,022 B1 * | 5/2001 | Bruck et al. | 709/201 |
| 6,253,216 B1 * | 6/2001 | Sutcliffe et al. | 707/500 |
| 6,345,764 B1 * | 2/2002 | Knowles | 235/472.01 |
| 6,389,469 B1 * | 5/2002 | Vekslar et al. | 709/226 |
| 6,507,872 B1 * | 1/2003 | Geshwind | 709/236 |
| 6,519,571 B1 * | 2/2003 | Guheen et al. | 705/14 |
| 6,625,581 B1 * | 9/2003 | Perkowski | 705/27 |
| 6,748,380 B2 * | 6/2004 | Poole et al. | 707/9 |
| 6,782,425 B1 * | 8/2004 | Germscheid et al. | 709/227 |
| 2001/0029527 A1 * | 10/2001 | Goshen | 709/218 |
| 2002/0073197 A1 * | 6/2002 | Bhogal et al. | 709/224 |
| 2004/0088197 A1 * | 5/2004 | Childress et al. | 705/4 |

FOREIGN PATENT DOCUMENTS

| | | | |
|---|---|---|---|
| CA | 2247330 | 9/1997 | |
| EP | 923036 | 12/1997 | |
| EP | 0 822 535 A2 | 2/1998 | |
| GB | 2328537 | 11/1997 | |
| WO | WO 00/17789 * | 3/2000 | 17/60 |
| WO | WO 01/67285 A2 * | 9/2004 | |

OTHER PUBLICATIONS

Miller, RJ et al. Data web: customizable database publishing for the web, vol. 4, issue: 4, Multimedia, IEEE, 1997, pp14-21.*

Venky Krishnan et al. Customized internet radio, Hewlett-Packard Lab, CA, 13 pages.*

Adam Field et al. "Personal DJ an Architecture for personalized content delivery", ACM, WWW10, May, 2001, pp1-8.*

Mingzhe Li et al. "characteristics of streaming media stored on the internet", Computer science technical report series, May 2003, 18 pages.*

Bruce Krulwich, Learning user interests across heterogeneous document databases, 1995, 5 pages.*

Brajnik, "A Shell for Developing Non-Monotonic User Modeling Systems," California Digital Library International Journal of Human-Computer Studies, vol. 40, No. 1, pp. 31-62, Jan. 01, 1994.

Dedrick, "Interactive Electronic Advertising," IEEE Multimedia1994, 1994.

Dedrick, "A Consumption Model for Targeted Electronic Advertising," IEEE Multimedia, Summer 1995, pp 41-49, Summer 1995.

Lieberman, "Letizia: An Agent that Assists Web Browsing," M.I.T. Media-Lab, Cambridge, MA, Aug. 01, 1995.

Pazzani, "Learning from hotlists and coldlists: Towards a WWW information filtering and seeking agent," Dept. Information & Computer Science, UC Irvine, May 19, 1998.

* cited by examiner

CREATING CUSTOMIZED INTERNET ACCESS CLIENT USER INTERFACE

RELATED APPLICATION INFORMATION

This application is related to the following U.S. patent applications, which are incorporated herein by reference:
(1) application Ser. No. 09/348,411 is pending filed Jul. 7, 1999 entitled "Independent Internet Client with Ad Display Capabilities," and
(2) application Ser. No. 09/393,391 is pending filed Sep. 10, 1999 entitled "Dynamic Ad Targeting by an Internet Server."

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates to Internet access user interfaces which facilitate access to the Internet from a client or local device.

2. Description of Related Art

Online services today offer a variety of services to their users. Users may access news, weather, financial, sports, and entertainment services, participate in and retrieve information from online discussion groups, and send and receive email. A user of an online service typically accesses the service using specialized communication software (i.e., client application or client software) that establishes and manages a connection or session from the user's computer (or client) to the online service provider's host computers (or servers) and facilitates the user's interactions with the service.

In addition, there is provided software to display pages or screens relating to retrieved content according to views or presentations specific to the online service. This software may be integrated with the client application. The functionality of the content, and the user interface (i.e., icons, dialog boxes, menus, etc.) for interacting with the content, are typically dictated by various standards.

Interactions between the user's computer and the online service are facilitated by a variety of software protocols (i.e., communication conventions, rules and structures), including application level protocols, for managing the transfer of data across the network and to the client application on the user's computer. A protocol may be proprietary or exclusive to an online service such that only client software from the online service provider may be used to communicate with the server software. For example, an online service provider that supports electronic mail, discussion groups, chat groups, news services, etc. may define and use specific protocols for each type of service so that appropriate information is exchanged between the participants (i.e., clients and servers). Each application-specific protocol may be based on a common, underlying protocol.

The Internet and World Wide Web ("Web"), comprised of a vast array of international computer networks, may provide online service users with considerable information resources and other content. Typically, this content is accessed using a web browser, such as Microsoft Internet Explorer or Netscape Navigator, capable of understanding the HyperText Markup Language (HTML) used to create the documents found on the Web and the HyperText Transfer Protocol (HTTP) used to navigate the Web. Email and Usenet discussion groups are typically accessed through companion software to the browser. Although web browsers typically have varying levels of functionality or sophistication, retrieved content is displayed in content pages according to views or presentations specific to the web document currently presented by the web browser. Typically, the views and presentations are different than those provided by the communication software from the online service provider because the web browser is, in fact, a separate client application displaying web documents containing presentation directives.

When using a browser, the browser issues HTTP messages to request web pages. A requested web page is typically identified using its URL—uniform resource locator. The URL is a reference (or address) to a resource available on a TCP/IP network such as the Internet. A URL is composed of a character string, and may have a number of parts. These parts include a top level domain name, second level domain name, directory name, and file name. URLs may identify a file located on a web server. URLs may also point to other resources on the network such as database queries and command output. The determination and use of URLs is well-known in the art.

There are a number of types of online service providers (OSPs). Online services may serve the general public or may serve a limited class of individuals. Some public OSPs utilize proprietary networks; America Online and @Home are examples. Other public OSPs use the public networks, and most Internet Service Providers (ISPs) are an example. OSPs often provide Internet access. Internet access is the primary service provided by some OSPs, most notably ISPs.

Users typically connect to an OSP using a computer with a communications device such as an analog modem, an Ethernet adapter, DSL adapter or cable modem. Such connections may be analog or digital, dial-up or constantly-connected. Subscribers typically pay a fee for their subscriptions to OSPs. These fees typically are in the form of a sign-up fee, plus online charges which are fixed (i.e., unlimited monthly access for a fixed fee) or based upon the amount of time the user is connected to the online service.

The portion of the client application that facilitates interactions between the client and server includes user interface drivers. The drivers manage the presentation of the user interface at the client, and also the processing of data entered through the user interface or received by the client application for use in connection with the user interface. The software is typically provided to users by OSPs on disk, CD-ROM, or as a download from the Internet. The users then load the software onto their local device, and configure the software to enable proper and efficient Internet access through the OSP. The user interface then remains unchanged unless the user loads an upgraded version of the Internet access software provided by the OSP.

Upgraded versions typically include new program objects (the visual elements of the user interface) and new program resources (functions) associated therewith. However, upgrading to a totally new version of Internet access software typically presents many potential problems. For example, if performed over a dial-up connection, the amount of time required can be quite substantial, and the process is prone to errors due to communications failures. Even if performed in another manner, it is typically not practical to upgrade on a frequent basis, due to overhead costs and the required manual participation of consumers.

Accordingly, there exists a need for an Internet access user interface which can be updated on a frequent basis without requiring a significant amount of time or user participation, in which the visual representation of the interface (including the program objects) and the associated functions (including the program resources) can be customized to an individual user and automatically updated during an Internet session.

SUMMARY OF THE INVENTION

In accordance with the present invention, there is provided a customized Internet access client user interface. A template defines the basic layout of the user interface, and is typically stored at the local device. The template has various slots designated for receiving program components, which are made up of program objects and corresponding program resources. More than one template may be provided so that more than one basic UI may be utilized.

Program objects are typically represented visually by graphics images such as buttons, menus, images, bars, windows, and other icons, and each object may have characteristics associated therewith. The characteristics may include size, shape, color, associated text (including font and font size), animation settings, etc. Program objects may be dependent on other program objects, or they may be independent from other program objects. Program resources are functions, applications, programs, scripts, commands, or other sequences of events which occur in response to activation of a program object. Activation of a program object may itself result in presentation, deletion, or modification of a program object.

Each time the local device establishes a session with the server, the server sends the program objects and program resources to the local device with rules assigning them to appropriate slots within the template. The server may also send the template, but typically the template is not sent except for in connection with a major user interface upgrade. By sending the template only in limited situations, frequent transfer of a large portion of the user interface data to the local device is avoided.

Both the program objects and the corresponding program resources are selected by the server based in part upon profile data associated with the local device or with individual user's of the local device. Some profile data is typically supplied by the client user, and may include user preferences, demographics, and other personal data. Other profile data is derived from statistics gathered by the client application regarding the user's use of the client application. The profile data can be updated at the beginning of each session, or during, or at the end of the session. By selecting the program objects and resources based in part upon the profile data which the client application can supply each time an Internet session is established, the program objects and resources may be customized for each session of each independent local device connecting to the server.

Still further objects and advantages attaching to the system and to its use and operation will be apparent to those skilled in the art from the following particular description.

DESCRIPTION OF THE DRAWINGS

Further objects of this invention, together with additional features contributing thereto and advantages accruing therefrom, will be apparent from the following description of a preferred embodiment of the present invention which is shown in the accompanying drawings with like reference numerals indicating corresponding parts throughout and which is to be read in conjunction with the following drawings, wherein.

These and additional embodiments of the invention may now be better understood by turning to the following detailed description wherein illustrated embodiments are described.

DETAILED DESCRIPTION OF THE INVENTION

Throughout this description, the preferred embodiment and examples shown should be considered as exemplars, rather than limitations on the apparatus and methods of the present invention. For example, the present invention will be described primarily in the context of a single local device communicating with a single OSP server, but the inventive concepts herein are equally applicable to networks comprising multiple clients and servers.

The System of the Invention

The system of the invention enables creation, display, and use of a customized Internet access client user interface. "Local device" as used herein refers to a computer or other device having a display associated therewith, and capable of receiving data from a second device over a network.

Figure 1:
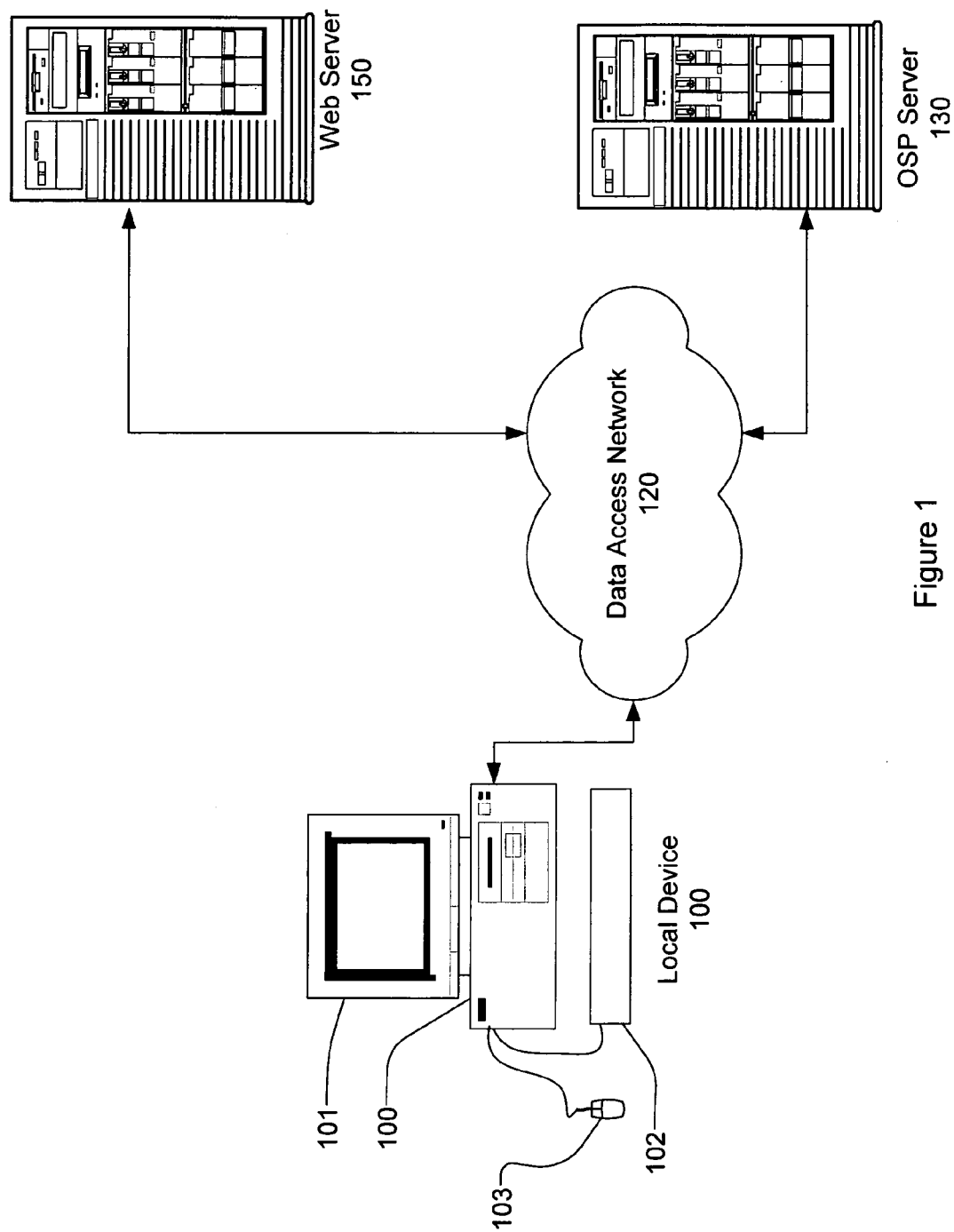
FIG. 1 is a first block diagram of a network data distribution system in accordance with the invention.

Referring now to FIG. 1, there is shown a block diagram of a network data distribution system in accordance with the invention in conjunction with a source of web pages. FIG. 1 includes a local device 100, a data access network 120, an OSP server 130 and a web server 150. The local device 100, the data access network 120 and the OSP server 130 comprise the network data distribution system. The local device 100 is provided online service to the network data distribution system under control of the OSP server 130. An online service provider controls the OSP server 130.

The local device 100 typically comprises a client computer that is configured to access the OSP server 130 via the local access network 120. The client computer may be, for example, a PC running a Microsoft Windows operating system. The local device 100 typically includes an output device, such as display 101, and an input device, such as keyboard 102 and/or pointing device 103 (e.g., mouse, track ball, light pen, or data glove). The local device 100 may also be, for example, an Internet appliance, network computer (NC), or an appropriately Internet-enabled device such as a portable digital assistant (PDA), mobile phone, refrigerator, etc. The particular type of device of the local device 100 is not considered to be important so long as the local device 100 can provide some measure of individual user interactivity with an online service.

The data access network 120 provides lower layer network support for the local device 100 to interact with online service, including the OSP server 130 and the web server 150. The data access network 120 typically comprises a common or private bi-directional telecommunications network (e.g., a public switched telephone network (PSTN), a cable-based telecommunication network, a LAN, a WAN, a wireless network), coupled with or overlaid by a TCP/IP network (e.g., the Internet or an intranet).

The web server 150 may be of the type known in the art and has the ability to serve web pages to the local device 100, as requested in the manner known in the art. It should be appreciated that the web server 150 is representative of any source of web pages available to the local device 100. Thus, for example, the web server 150 could be accessible from the Internet, or it could be a part of an intranet and represents any number of web servers.

The OSP server 130 typically is a computer system, such as a server computer. Alternatively, the OSP server 130 may be considered to represent a number of physical devices which as a group provide the indicated network services. For example, the OSP server 130 could include a dedicated advertisement server that processes advertisement-related data. The OSP server 130 acts as a recipient of certain information transmitted by the local device 100, as described further below. The OSP server 130 typically also transmits certain data to the local device 100 as described further below.

Computer software programmed to implement the methods described herein, may be stored at the local device 100, a server such as OSP server 130 or web server 150, a third party computer, or any combination thereof. Similarly, the software may execute at various combinations of locations, as described herein.

Figure 2:
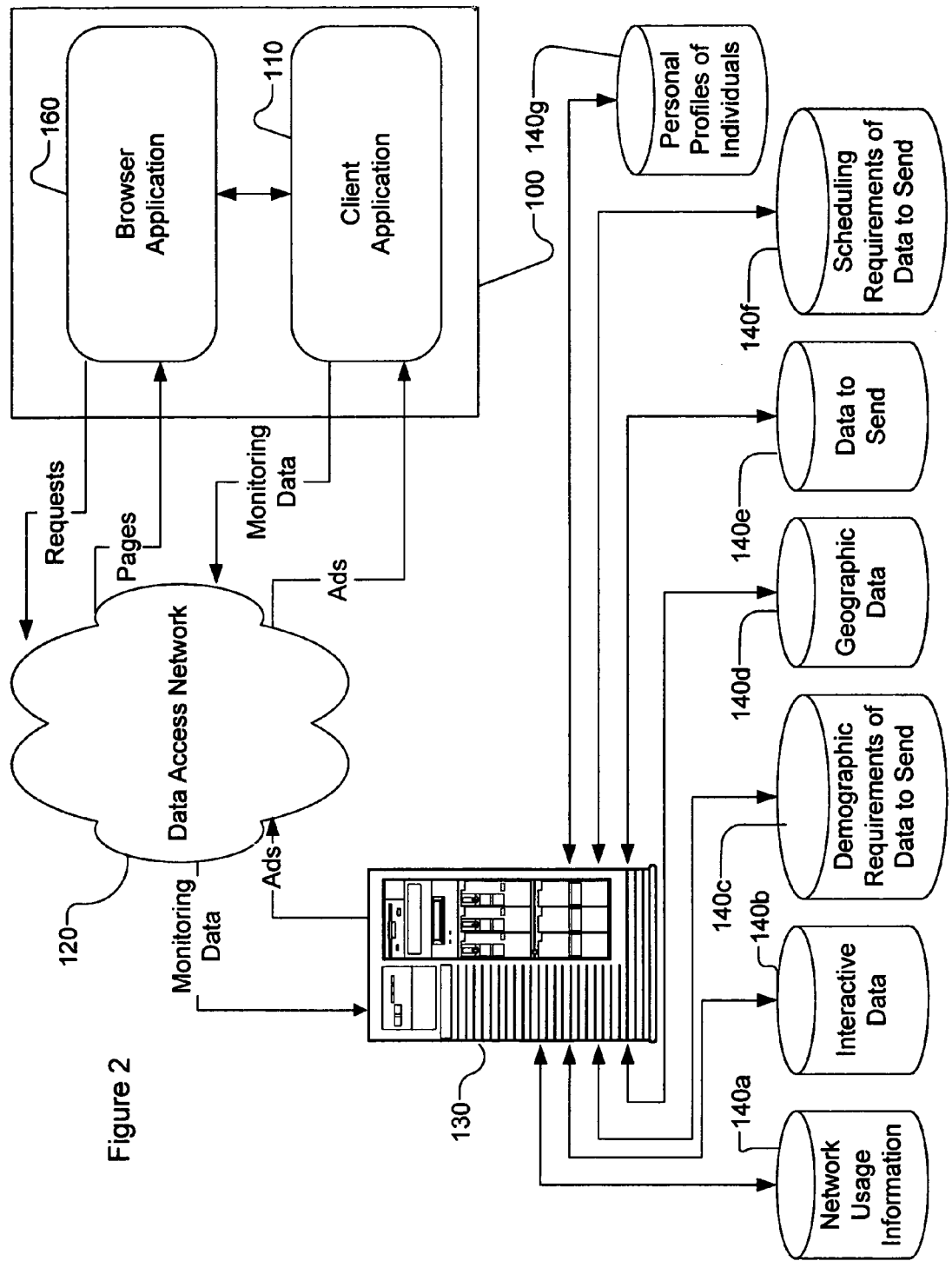
FIG. 2 is a second block diagram of a network data distribution system in accordance with the present invention.

Referring now to FIG. 2, there is shown a block diagram of a network data distribution system of an online service in accordance with the present invention. The system comprises a client application 110, the data access network 120, the OSP server 130 and data stores 140a–g (collectively, 140). A browser application 160 is also shown. A "browser application" is software that provides interactive utilization of hypertext objects located on a network, such as web pages on the Internet. As used herein, "browser application" also includes most email clients and ftp clients. The client application 110 is a program operative on local device 100, and typically an independent application program or a DLL. The client application 110 typically retrieves certain network data, displays certain network data, transmits geographic location data, transmits interactive user data, transmits network usage data and transmits personal profile information as described herein. The client application 110 typically also sets up and provides access to the online service. The data stores 140 store and provide this geographic information data 140d, network usage data 140a, interactive usage data 140b, personal profile information 140g, data to be sent 140e, schedule for transmitting data 140f and demographics for transmitting data 140c.

The browser application 160, such as Microsoft Internet Explorer or Netscape Navigator is typically installed on the local device 100. When the local device 100 is connected to the web server 150 through the data access network 120, the user of the local device browses the web server 150 from the local device 100 using the browser application. The browser application itself need not be stored on the local device 100. The important aspect is that the user, from the local device 100, can exercise control over what web pages are requested and thus displayed by the local device 100.

Each time a user uses the local device 100 to connect to the online service, the client application 110 and the OSP server 130 establish a session. In this session, the client application 110 transmits certain information regarding the user of the local device 100 and his use of the local device 100 while connected to the online service. The OSP server 130, on the other hand, uses the information from the client application 100 to determine information which should be sent to the client application 110. The information from the client application 110 is analyzed and used by the OSP server 130 as described herein, to select program objects and program resources to send to the local device 100 for producing a customized Internet access client user interface. The client application 110 then causes the customized user interface to be displayed on the local device's output device 101, and to be operative with customized functionality.

The information from the client application 110 regarding the user typically includes geographic data and personal profile information. Geographic data indicating the user's current location typically is sent from the client application 110 to the OSP server 130, which then stores the geographic data in the data store 140d. This geographic data can be something simple, like a phone number. The user typically provides personal profile information on a periodic basis which is stored in the data store 140g and used by the OSP server 130. This information comprises data such as: age, sex, marriage status, home address and personal interests.

The information regarding the user's use of the local device 100 includes email usage, web usage, advertisement click-throughs, and other statistics regarding use of the client application 110. The user's interactions and feedback with the web server 150 provided through the browser application 160 are typically captured by the client application 110, analyzed by the OSP server 130 and stored in the data store 140b. This includes the user's feedback and responses to the data delivered to the browser application 160. The user's activities on the web server 150 provided through the browser application 160 are typically captured by the client application 110, analyzed by the OSP server 130 and stored in the data store 140a. This includes the type of network data the user requests and accesses. This data is typically summarized and classified into multiple demographic profiles.

The data to be sent to users typically has scheduling requirements that dictate when it should be sent. These scheduling requirements include (but are not limited to): frequency, maximum number of times to send to an individual, minimum number of times to send to an individual, time of day to send, and first and last days to send. The data to be sent to users can have demographic requirements that dictate to whom it should be sent. These include (but are not limited to): personal profile, interactive data, network usage information and geographic location.

Figure 3:
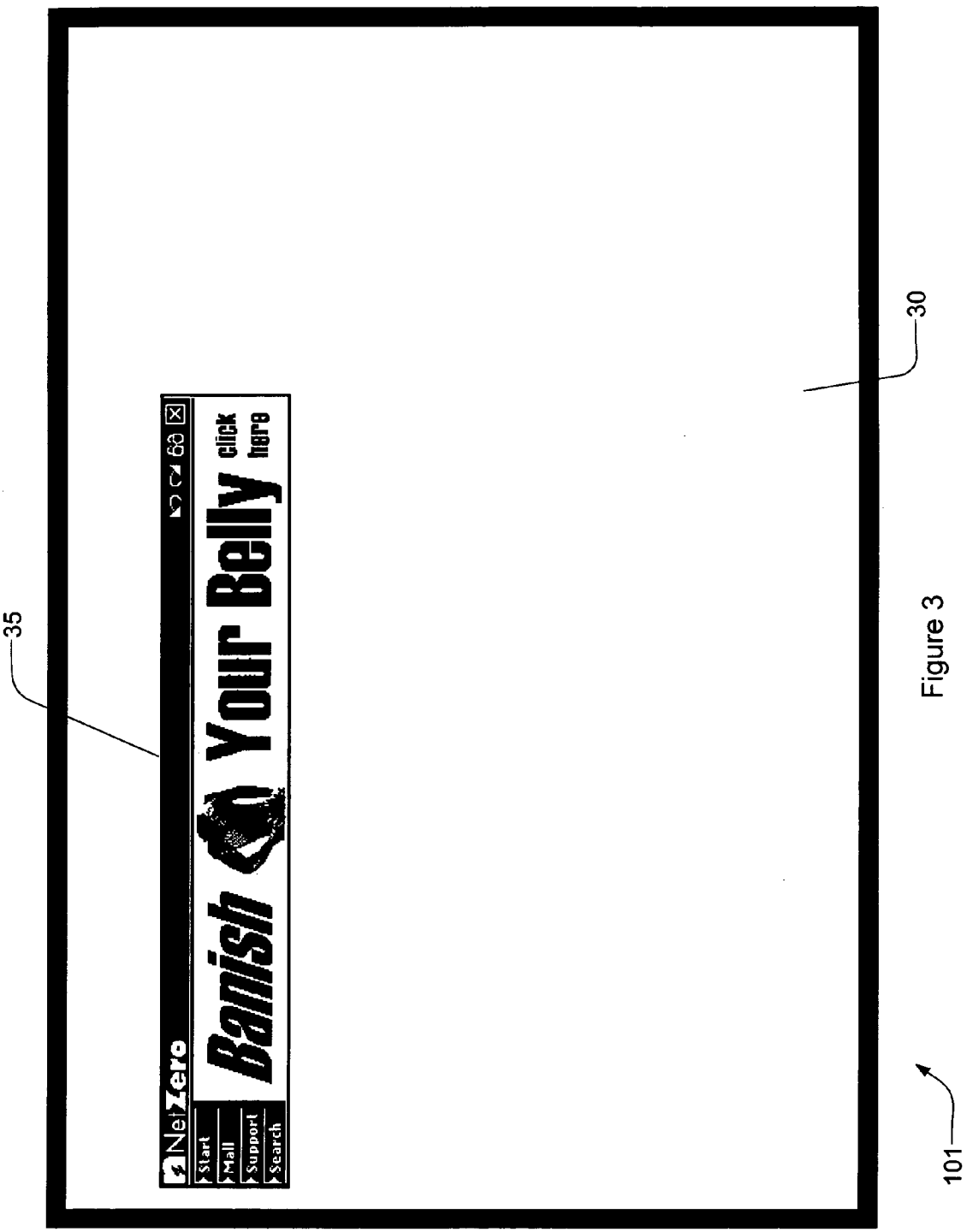
FIG. 3 is a display screen showing the positioning of an Internet access client user interface in accordance with one embodiment of the present invention.

Turning now to FIG. 3, there is shown the display screen 101 of a local device 100, with display area 30 having positioned thereon a visual representation of the outline of a user interface 35. The user interface 35 is shown as a client window, occupying only a portion of display area 30, such that the remainder of the display area 30 may be used for other content, including HTML-formatted data. However, the client window may cover the entire display area 30. The exact size, shape, and positioning of the client window within the display area 30 may vary and is not important. A detailed layout of user interface 35 in accordance with one embodiment of the present invention is shown in FIGS. 4 and 5.

Figure 4:
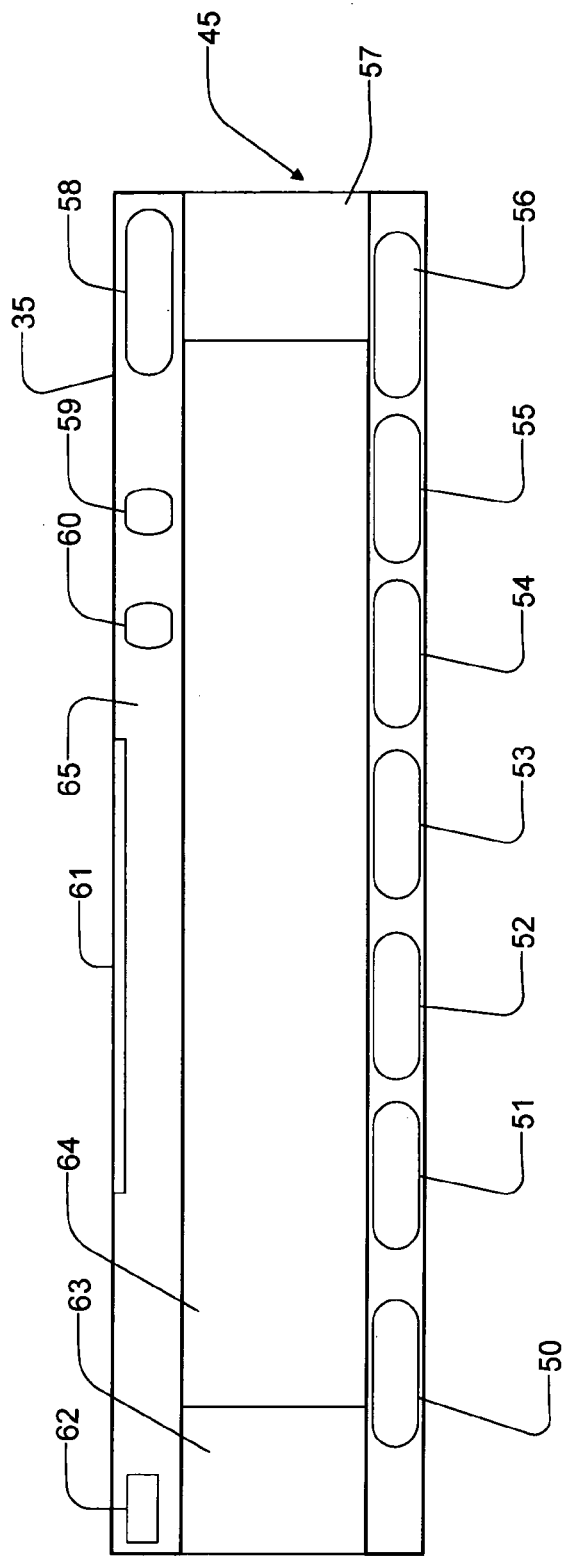
FIG. 4 shows the layout of an Internet access client user interface template in accordance with one embodiment of the present invention.
Figure 5:
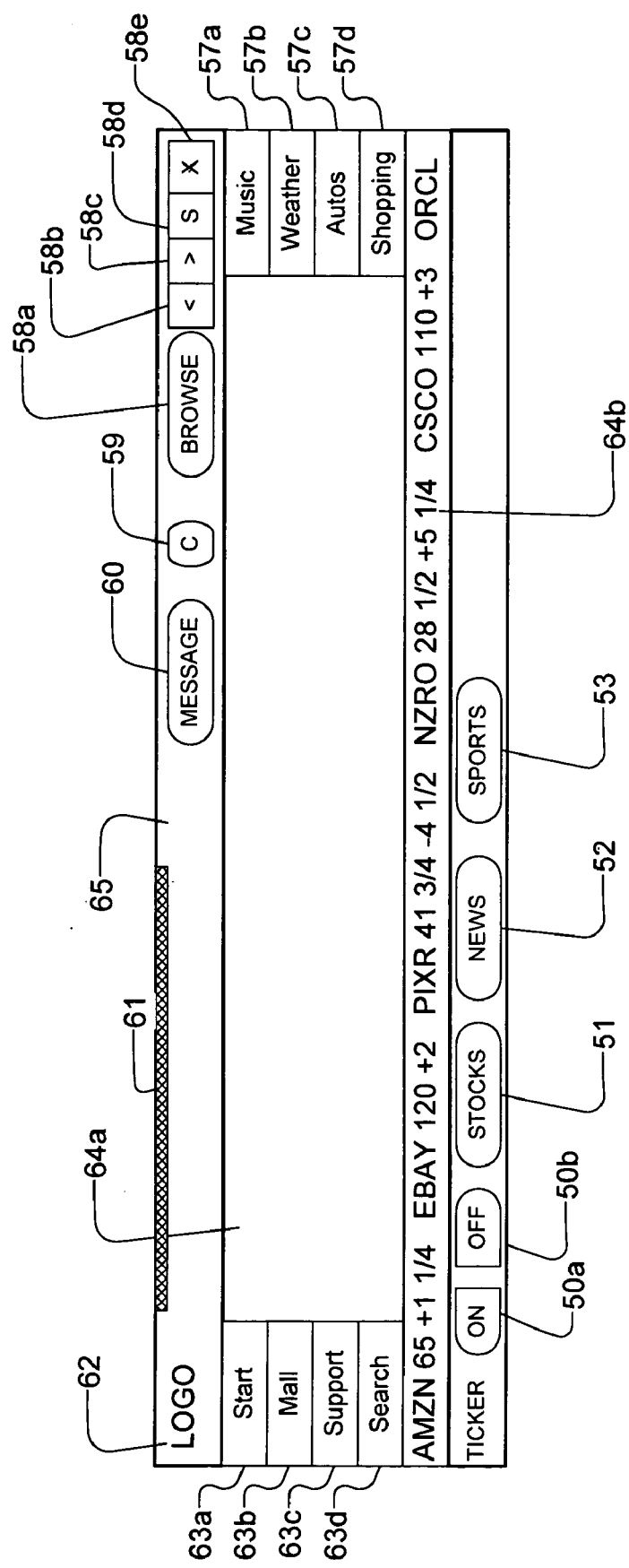
FIG. 5 shows the Internet access client user interface template of FIG. 4, with some slots filled by program objects in accordance with one embodiment of the present invention.

Turning now to FIG. 4 there is shown the layout of an Internet access client user interface template 45 in accordance with one embodiment of the present invention. The underlying template definitions and other associated software are typically stored at the local device 100, and updated by the server 130 at each session if necessary. The template 45 has various slots 50, 51, 52, 53, 54, 55, 56, 57, 58, 59, 60, 61, 62, 63, and 64 for receiving program objects, as described in more detail shortly. Area 65 may also be considered a slot, but for convenience is sometimes referred to herein as the background to distinguish it from other slots.

Each slot 50-64 has various parameters associated therewith which define the location thereof relative to other slots within the template 45, and which define the allowable program objects that can be received therein. For example, a slot 50-64 can be defined to receive program objects of only specified shapes, colors, sizes, or a specified type as described in more detail shortly. A slot may also be defined to receive program objects which have only certain program resources assigned thereto, as described in more detail in connection with the description of FIG. 5. The particular quantity and layout of slots 50-64 can vary greatly depending on the requirements or limitations of systems implementing the inventive concepts described herein. It is convenient, however, to define a default template, such as template 45 seen in FIG. 4. The default template 45 can then be used as a starting point for multiple local devices, and can be customized as needed for each independent local device.

As previously described, program objects are typically represented visually by graphics images such as buttons, menus, images, bars, windows, and other icons. Typically, program objects are active, in that activation thereof results in the execution of a program resource, such as a function, application, program, script, command, or other sequences of events. The sequence of events may itself result in presentation, deletion, or modification of another program object. A program object may also be inactive, in that it cannot be activated but is simply a visual filler for its associated slot within a template. In one embodiment of the present invention, background 65 is limited to receiving only inactive program objects.

Each program object may have characteristics associated therewith, and can be classified based upon the characteristics. The characteristics can include size, shape, color, associated text (including font, font size, and language), animation settings, etc. Other characteristics may include associated indicators or flags, which represent whether a certain feature is or is not associated with the program object. An example of one feature is whether the program object is active or inactive. An example of another feature is whether the program object has any parent or children objects. Such a relationship is described in more detail in connection with the description of FIG. 5.

Turning now to FIG. 5, there is shown the template 45 of FIG. 4, with some of slots 50-64 filled by program objects in accordance with one embodiment of the present invention. For convenience, various features are illustrated in FIG. 5, which are best understood when comparing FIG. 5 to FIG. 4. For example slots 51, 52, 53, and 61 in FIG. 5 received objects with size and shape characteristics substantially the same as their corresponding slots. Specifically, slots 51-53 received graphic images of buttons with associated text "STOCKS", "NEWS" and "SPORTS," respectively. Slot 61 received a graphic htach fitted to the default size and shape of slot 61.

Slot 50 received multiple objects 50a and 50b with associated text "OFF" and "ON" respectively. Slots 59 and 60 received objects with shape characteristics different than those associated with the default slots. Slot 62 received an object represented by "LOGO". Slots 57, 58, 63, and 64, each received nested objects. A nested object refers to an object that has a parent or child object. Though such relationships may be defined in software similarly for various nested objects, visually the nested objects may take on many different forms. For example, slot 57 received a menu as a program object (the parent), which has nested program objects 57a, 57b, 57c, and 57e as selectable options (the children). Similarly, slot 63 received a nested object comprising a menu (the parent) and nested objects 63a, 63b, 63c and 63d as selectable options (the children). Slot 64 received a nested program object comprising a window (the parent) broken into sub-windows 64a and 64b (the children). Slot 58 received a nested program object comprising a selection bar (the parent) and nested objects 58a, 58b, 58c, 58d, and 58e (the children). Program objects may be nested beyond just a single level, though that is not shown in FIG. 5. Also, a program object can have various additional characteristics associated therewith, which together define the overall audio-visual presentation of the object.

As previously described, program objects can optionally have program resources associated therewith, and if so, the combined program object and program resource is referred to as program component. Program resources are functions, applications, programs, commands, scripts, or other sequences of events which occur in response to activation of a program object. Still referring to FIG. 5, various types of program resources will be described.

One type of program resource is a hyperlink. For example, a hyperlink to a website dedicated to providing financial data might be associated with the object "STOCKS" assigned to slot 51. In such a case, activation of the object assigned to slot 51 would connect the user to the associated website. The actual web content can be displayed in a new or existing browser window, or in another area such as area 64a within the user interface 45. Similar resources could be associated with the objects assigned to slots 52,53, 54, 55, and 56. Hyperlink resources could also be associated with objects 57a–57d and 63a–63d.

Another type of program resource is a script, command, or other application. For example, the program resource associated with program object 58e is an operating system command to close the user interface application, and that for program object 58d is to launch a help program. The program resource associated with the object 58a is a program, such as Internet browser application 160. Program resources associated with the objects 58c and 58d can assist in the browsing by allowing access to "next" and "previous" items to be browsed. Alternatively, these resources may be used to cycle through a series of display ads shown in area 64a, or of other program objects. In one embodiment of the present invention, the program resources associated with program objects 58c and 58d allow the user to cycle through various customized interfaces. Such an application might be particularly useful to allow multiple users to access the OSP from the same local device at various times, each having their own customized user interface readily accessible.

Additional scripts or programs are associated with other objects. For example, the object assigned to slot 59 allows a user to customize the user interface 45 in terms of objects and resources, by selecting from those currently available. The program resource associated with the object assigned to slot 60 launches an e-mail program, such as Microsoft Outlook. The program resource associated with the object assigned to slot 61 allows the user to grab and reposition the user interface 45 at a suitable location on display area 30. The program resource associated with the object assigned to slot 62 provides the user more information about the OSP whose logo appears as part of the object. The information may be stored at the local device, or the resource may be a hyperlink resource linking the user to the OSP's home page.

Still referring to FIG. 5, program object 64a is window with an advertisement in the form of a GIF or other graphic, text, audio-visual, or animated format file. The program resource associated therewith can be a hyperlink to the advertiser's website, a link to directly purchase the advertised product, or another link. Program object 64b is a window with moving ticker data. The ticker itself may be turned on or off by activating program objects 50b or 50a respectively, and may be customized by, e.g., activating customization button 59.

The various types of program resources described in connection with FIG. 5 are intended to be exemplary only, and it should be understood that other program resources can be associated with program objects without departing from the inventive concepts described herein. Also, it is not required that a program object has a program resource assigned thereto. For example, the background 65 can be considered a program object with no program resource assigned thereto. Multiple independent users can customize the program objects and their associated program resources, even when starting from the same template. Thus, FIG. 5 shows an example of only one customization of a user interface 45 in accordance with the present invention.

The Method of the Invention

Figure 6:
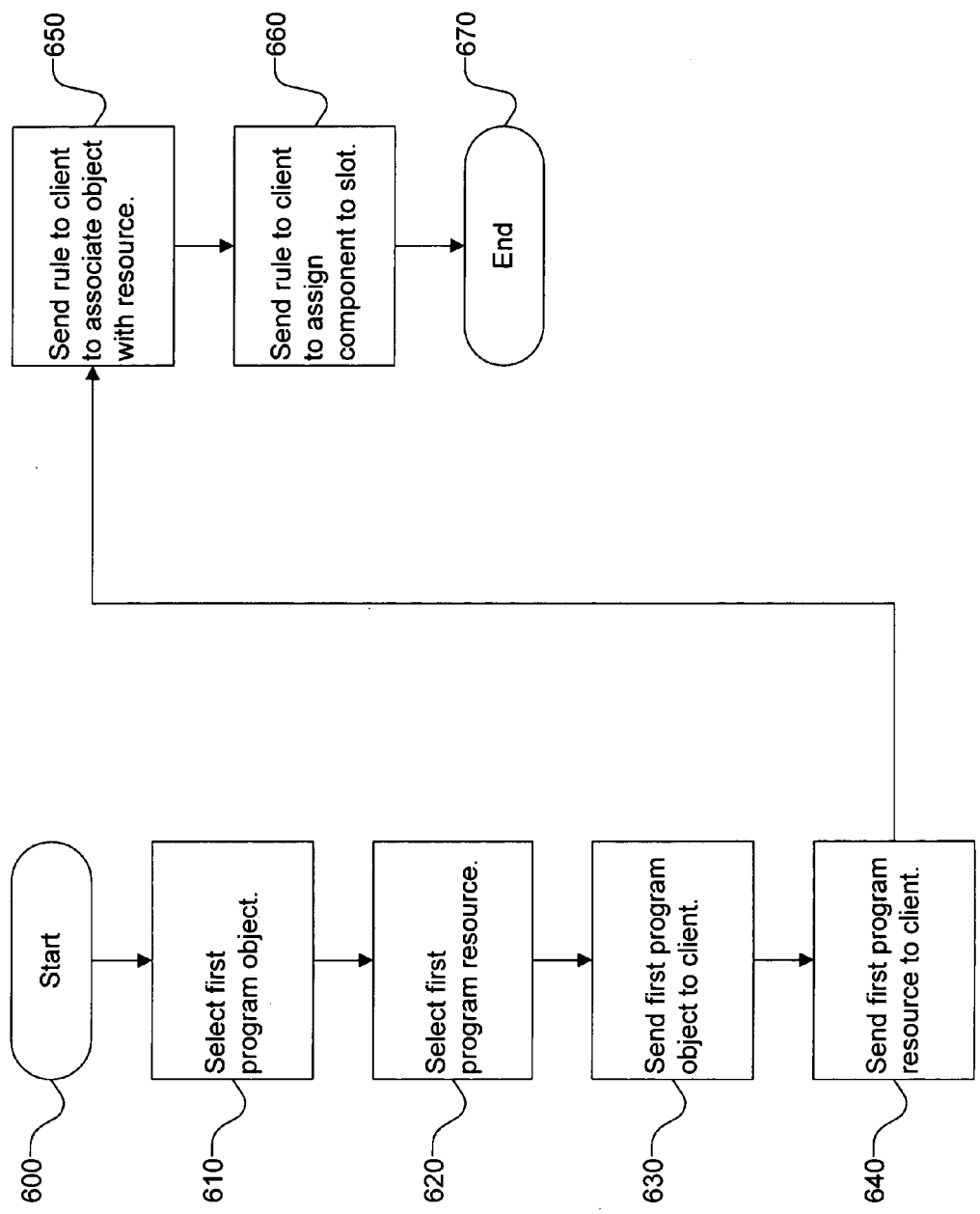
FIG. 6 is a flowchart illustrating the steps involved at a server in creating a customized Internet access client user interface in accordance with one embodiment of the present invention.
Figure 7:
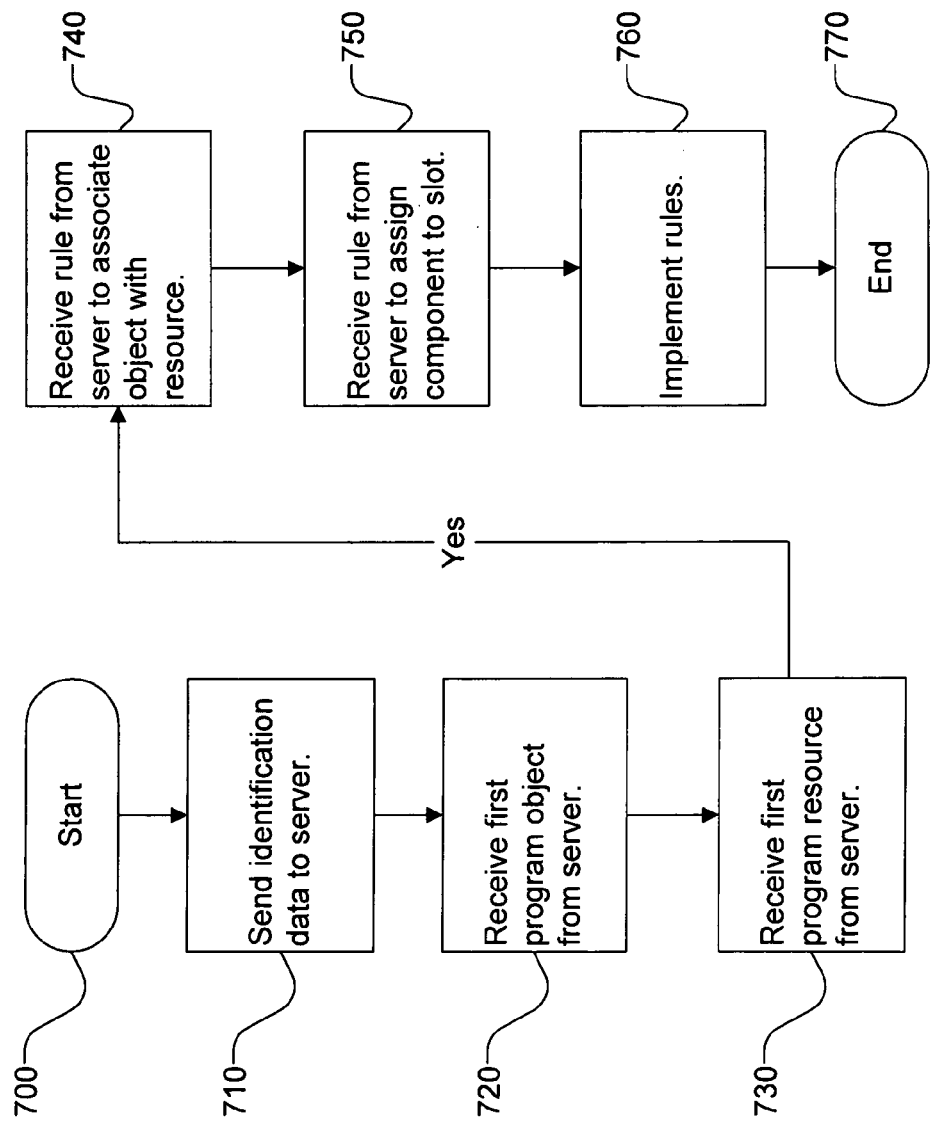
FIG. 7 is a flowchart illustrating the steps involved at a local device in creating a customized Internet access client user interface in accordance with one embodiment of the present invention.

Turning now to FIG. 6 and FIG. 7, the methods of the present invention will be described. FIG. 6 is a flowchart illustrating the steps involved at a server in creating a customized Internet access client user interface in accordance with one embodiment of the present invention. The process begins at step 600, typically by establishing a session between the local device and the OSP server.

At step 610 a program object is selected by the server to be assigned to a particular slot within a user interface template. The template is typically stored at the server, and is sent to the local device during an initial session and when any modifications or upgrades are implemented. The server also sends rules to the local device defining the template and defining slots associated with the template for receiving program components. In this manner, multiple independent local devices can store the template and related definitions, and can each receive program objects and resources (combined to form program components) to fill in the template slots in a customized fashion to suit their individual needs. Since the template is not transferred during this process, the overall transfer time is significantly reduced.

As previously described, the set of available program objects to be assigned to the designated slot may be limited based upon parameters associated with the slot. The particular program object selected from the available set is determined based in part upon profile data associated with a local device. The profile data can be provided by the user through the user interface, or it can be provided by the client application based upon statistics tracked by the client application regarding use of the client application.

The type of profile data typically provided by the user through the user interface includes a client ID, and user preferences, such as color, size, shape, text language, and positioning of program objects, as well as hyperlinks and other resources associated with the preferred objects. The profile data can also include security codes (e.g., as set by a parent for a child's Internet access) which limit the availability of certain objects or resources. The type of profile data typically provided by the client application based upon statistics tracked by the client application, include web use statistics and client application use statistics. The former includes, for example, email usage, web usage, and Internet ad click-throughs. The latter includes, for example, use of the various components associated with the user interface. Each type of profile data are stored in data stores 140 for analysis and use by server 130 in selecting program objects, resources, and relationships, to send to the local device as described herein.

In a similar manner, a program resource is selected from a set of available program resources based in part upon the profile data, as seen at step 620. The available set may be further limited based upon the selected program object. Even if the server determines that a particular program object or program resource is to be changed for the user interface at the local device, it may be necessary to send only the rule instructing the change, as the program object or resource itself may already be stored at the local device even though the program object or resource was not being used in the then-current user interface.

Using profile data to select the program objects, resources, and rules to send to a particular local device, has many practical advantages. For example, user interfaces may be specifically targeted for users based on local e-commerce, government regulations, direct marketing statistics, or individual user trends. In this manner, if the server determines from the tracking profile data that a particular user at a local device often activates the stock ticker object 51 (FIG. 5), then the ads sent to the local device for display in area 64a can be related to financial businesses. The OSP can thus target specific ads to audiences most likely to respond thereto. The server can also send an extra stock component (e.g., the object seen at slot 56) to provide the user an additional link to an additional financial resource.

The user interface can also be tailored based upon criteria other than profile data as previously described. For example, based upon a brand name indicator (a system indicator or other data field), a particular template can be filled with components having program objects and associated text in a designated language, with appropriate resources associated therewith. Though the indicator may be provided as part of the profile data, the indicator may also be assigned to a particular client device or user based upon third party information supplied to the OSP. The third party could be a company with brand name recognition in a particular sector of the community or in a particular foreign country, desiring to use the OSP's infrastructure but under the third party's own brand name. The third party could supply data to the OSP, which stores the data in data stores 140, and is then able to identify the client devices or users to assign the indicators to, and the users would then receive service from the OSP under the brand name of the third party.

Once the program object and associated program resource are selected, they are sent to the local device, as seen at steps 630 and 640. Additionally, rules are sent to the local device, as seen at steps 650 and 660, associating the selected program resource with the selected program object to define a program component, and to assign the program component to the designated template slot. The rules may be sent as a single rule, or separate rules. The process of selecting a program object and/or a program resource for a particular slot is typically repeated for each template slot to be filled. This may include, however, default program objects, resources, or combined components, which can be stored at the local device and/or at the server. The process then ends at step 670.

In a typical scenario, the rules defining the template are sent to the local device during an initial session, and the rules defining program objects, resources, and components are sent to the local device during the initial session and subsequent sessions, as new profile data (including user preferences) are sent to the server. Multiple user interfaces may be defined for each local device, and the use of any particular user interface can be determined based upon various factors, including a portion of the profile data representing the identity of the client user. In such an embodiment, as previously described with reference to program objects 58c and 58d, the available user interfaces can be cycled through by activating a program object associated with the user interface itself.

The customization is applicable to a single user at a single local device, multiple users at a single local device, and multiple users at multiple local devices. For example, a single user might have a business user interface, a private user interface, and a shared user interface. The business user interface might be desirable during working hours. The private user interface might be desirable after business hours, or only at a particular local device which is secured from unauthorized access. The shared user interface might be desirable for a local device accessible to the user's entire family. The power of allowing customization of the user interface might be best appreciated referring back to FIG. 5.

In a business interface, program objects 57a–57d might be associated with hyperlink program resources linking directly to business websites. Similarly, program object 64a can be associated with a video-conferencing software program that allows video conferencing within area 64a. Program object 64b can be associated with a financial ticker application, as seen in FIG. 5. And the background 65 can be a conservative pattern. Using the same template 45 with a private interface, program objects 57a–57d might be associated with hyperlink program resources linking directly to game or hobby sites. Program objects 64a and 64b can be merged into a single program object, and associated with a software program that cycles automatically through a designated or custom-loaded photo library. And background 65 can be a scene or pattern of the user's personal preference. Similar customizations can be applied to a family user interface, or any other individual or group user interface.

Turning now to FIG. 7, there is shown a flowchart illustrating the steps involved at a local device in creating a customized Internet access client user interface in accordance with one embodiment of the present invention. The process begins at step 700, again typically by establishing a session between the local device and the OSP server. At step 710, the client application 110 then sends profile data to the server, which the server reviews and analyzes to assist in selecting appropriate program objects and program resources from available sets thereof as previously described herein.

The local device then receives the program objects and program resources from the server, as seen at steps 720 and 730, as well as rules (steps 740 and 750) to associate the program objects with their corresponding selected program resources, and to assign the combined program components to particular slots within the user interface template. The rules may be received independently from each other, or as a combined rule or rule set.

The local device then implements the rules at step 760, by associating the program objects with the program resources as specified, assigning the resulting program components to the specified slots, and displaying the user interface on its display with the selected program objects displayed at the designated slots within the template. Default objects may be displayed at unfilled slots, and default program resources are assigned to active program objects lacking resources. The resulting customized Internet access client user interface is such as that seen in FIG. 5, with all slots filled with program objects, and each active program object having associated therewith a program resource, the program objects and resources having been selected based in part upon the profile data (typically including user preferences) supplied from the client application during the session.

As previously described, the template is typically received at the local device during an initial session with the server, and includes all required definitions and default settings. The rules defining program objects, resources, and components are typically sent to the local device during the initial session and subsequent sessions, as new profile data (including user preferences) are sent to the server. Multiple user interfaces may be defined for each local device, and the use of any particular user interface can be determined based upon various factors, including a portion of the profile data representing the identity of the client user. In such an embodiment, as previously described with reference to program objects 58c and 58d, the available user interfaces can be cycled through by activating a program object associated with the user interface itself.

In one alternative embodiment, the client application 110 includes plural templates. Each template would then correspond to an alternative UI, such as alternative views or layouts. For example, one template might correspond to a floating client window, and a second template might correspond to a fixed (e.g., docked) window. The program objects, program resources and rules may be shared by the templates, though some of the program objects, program resources and rules might not be used by some of the templates. The client application 110 may permit the user to select from the available templates, and may also limit or make the selection of active template.

The process then ends at step 770, and can be repeated during the same session or subsequent sessions. In one embodiment of the present invention, multiple customized user interfaces are stored at the local device, and selection of a particular user interface can occur off-line, that is while there is no session established. In such a situation, the selected user interface can then be uploaded to the server at the next session, so the server can track the client status, and provide appropriate suggestions or alternatives for additional program objects and/or resources.

It should also be recognized that the steps shown in FIG. 6 and FIG. 7 are not required to be executed in the specific sequence shown, and that the only limits on the order of executing the steps is dictated by the functional requirements and dependencies as described herein. Additionally, with regard to the invention as described herein and as previously stated, it should be recognized that various steps described can occur either at the local device or at the server.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

What is claimed is:

1. A method of creating a customized Internet access client user interface comprising:
   selecting a first program object from a first set of available program objects based in part upon profile data associated with a local device;
   selecting a first program resource from a first set of available program resources based in part upon the profile data;
   sending the first program object to an Internet access client at the local device;
   sending the first program resource to the Internet access client at the local device;
   sending a first rule to the Internet access client at the local device to associate the first program object with the first program resource to form a first program component; and
   sending a second rule to the Internet access client at the local device to assign the first program component to a first slot associated with a template for an Internet access client user interface.

2. The method of claim 1, further comprising sending a third rule to the Internet access client at the local device defining the template and defining slots associated with the template for receiving program components, said slots comprising the first slot and a second slot.

3. The method of claim 2, further comprising:
   selecting a second program object from a second set of available program objects based in part upon the profile data;
   selecting a second program resource from a second set of available program resources based in part upon the profile data;
   sending the second program object to the Internet access client at the local device;
   sending the second program resource to the Internet access client at the local device;
   sending a fourth rule to the Internet access client at the local device to associate the second program object with the second program resource to form a second program component; and
   sending a fifth rule to the Internet access client at the local device to assign the second program component to the second slot.

4. The method of claim 2, wherein sending the first and second rules to the Internet access client at the local device is performed during a first session, and sending the third rule to the Internet access client at the local device is performed during a second session, the second session occurring in time before the first session.

5. The method of claim 4, wherein the profile data is received from the Internet access client at the local device during the second session.

6. The method of claim 1, further comprising:
   selecting a second program object from a second set of available program objects based in part upon the profile data;
   selecting a second program resource from a second set of available program resources based in part upon the profile data;
   sending the second program object to the Internet access client at the local device;
   sending the second program resource to the Internet access client at the local device;
   sending a third rule to the Internet access client at the local device to associate the second program object with the second program resource to form a second program component; and
   sending a fourth rule to the Internet access client at the local device to assign the second program component to a second slot associated with the template.

7. The method of claim 1, wherein the first and second rules are sent as a single rule.

8. The method of claim 1, wherein the profile data is received from the Internet access client at the local device during a session established with the local device.

9. The method of claim 1, wherein the first program resource is an executable computer program programmed to cycle through available customized user interfaces.

10. The method of claim 1, wherein the profile data comprises statistics regarding use of a client application associated with the local device.

11. A method of creating a customized Internet access client user interface in which an Internet access client performs actions comprising:
    sending profile data to a server;
    receiving a first program object from the server, said first program object having been selected from a first set of available program objects based in part upon the profile data;
    receiving a first program resource from the server, said first program resource having been selected from a first set of available program resources based in part upon the profile data;
    receiving a first rule from the server to associate the first program object with the first program resource to form a first program component;
    receiving a second rule from the server to assign the first program component to a first slot associated with a template for an Internet access client user interface of the Internet access client; and
    implementing the first and second rules by associating the first program object with the first program resource to form the first program component, assigning the first program component to the first slot, displaying the template on a display associated with a local device, and displaying the first program object on the display at a location corresponding to the first slot.

12. The method of claim 11, further comprising receiving a third rule from the server defining the template and defining slots associated with the template for receiving program components, said slots comprising the first slot and a second slot.

13. The method of claim 12, further comprising:
    receiving a second program object from the server, said second program object having been selected from a second set of available program objects based in part upon the profile data;

receiving a second program resource from the server, said second program resource having been selected from a second set of available program resources based in part upon the profile data;

receiving a fourth rule from the server to associate the second program object with the second program resource to form a second program component;

receiving a fifth rule from the server to assign the second program component to the second slot; and implementing the third, fourth, and fifth rules by associating the second program object with the second program resource to form the second program component, assigning the second program component to the second slot, displaying the template on a display associated with the local device, and displaying the second program object on the display at a location corresponding to the second slot.

14. The method of claim 12, wherein receiving the first and second rules is performed during a first session between the Internet access client and the server, and receiving the third rule is performed during a second session between the Internet access client and the server, the second session occurring in time before the first session.

15. The method of claim 14, wherein the Internet access client sends the profile data to the server during the second session.

16. The method of claim 11, further comprising:
receiving a second program object from the server, said second program object having been selected from a second set of available program objects based in part upon the profile data;

receiving a second program resource from the server, said second program resource having been selected from a second set of available program resources based in part upon the profile data;

receiving a third rule from the server to associate the second program object with the second program resource to form a second program component;

receiving a fourth rule from the server to assign the second program component to a second slot associated with the template; and implementing the third and fourth rules by associating the second program object with the second program resource to form the second program component, assigning the second program component to the second slot, and displaying the second program object on the display at a location corresponding to the second slot.

17. The method of claim 11, wherein the first and second rules are received as a single rule.

18. The method of claim 11, wherein the Internet access client sends the profile data to the server during a session established with the server.

19. The method of claim 11, wherein the first program resource is an executable computer program programmed to cycle through available customized user interfaces.

20. The method of claim 11, wherein the profile data comprises statistics regarding use of a client application.

21. A system for creating a customized Internet access client user interface, the system comprising:
an Internet server; and
computer software programmed to:
  a) select a first program object from a first set of available program objects based in part upon profile data associated with a local device;
  b) select a first program resource from a first set of available program resources based in part upon the profile data;
  c) send the first program object to an Internet access client at the local device;
  d) send the first program resource to the Internet access client at the local device;
  e) send a first rule to the Internet access client at the local device to associate the first program object with the first program resource to form a first program component; and
  f) send a second rule to the Internet access client at the local device to assign the first program component to a first slot associated with a template for an Internet access client user interface.

22. The system of claim 21, wherein the software is further programmed to send a third rule to the Internet access client at the local device defining the template and defining slots associated with the template for receiving program components, said slots comprising the first slot and a second slot.

23. The system of claim 22, wherein the software is further programmed to:
select a second program object from a second set of available program objects based in part upon the profile data;
select a second program resource from a second set of available program resources based in part upon the profile data;
send the second program object to the Internet access client at the local device;
send the second program resource to the Internet access client at the local device;
send a fourth rule to the Internet access client at the local device to associate the second program object with the second program resource to form a second program component; and
send a fifth rule to the Internet access client at the local device to assign the second program component to the second slot.

24. The system of claim 22, wherein the software is further programmed to send the first and second rules to the Internet access client at the local device during a first session, and to send the third rule to the Internet access client at the local device during a second session, the second session occurring in time before the first session.

25. The system of claim 24, wherein the software is further programmed to receive the profile data from the Internet access client at the local device during the second session.

26. The system of claim 21, wherein the software is further programmed to:
select a second program object from a second set of available program objects based in part upon the profile data;
select a second program resource from a second set of available program resources based in part upon the profile data;
send the second program object to the Internet access client at the local device;
send the second program resource to the Internet access client at the local device;
send a third rule to the Internet access client at the local device to associate the second program object with the second program resource to form a second program component; and
send a fourth rule to the Internet access client at the local device to assign the second program component to a second slot associated with the template.

27. The system of claim 21, wherein the software is further programmed to send the first and second rules as a single rule.

28. The system of claim 21, wherein the software is further programmed to receive the profile data from the Internet access client at the local device during a session established with the Internet access client at the local device.

29. The system of claim 21, wherein the first program resource is an executable computer program programmed to cycle through available customized user interfaces.

30. The system of claim 21, wherein the profile data comprises statistics regarding use of a client application associated with the local device.

31. A system for displaying a customized Internet access client user interface, the system comprising:
   a local device having a display; and
   computer software programmed to implement an Internet access client, the computer software to:
   a) send profile data to a server;
   b) receive a first program object from the server, said first program object having been selected from a first set of available program objects based in part upon the profile data;
   c) receive a first program resource from the server, said first program resource having been selected from a first set of available program resources based in part upon the profile data;
   d) receive a first rule from the server to associate the first program object with the first program resource to form a first program component;
   e) receive a second rule from the server to assign the first program component to a first slot associated with a template for an Internet access client user interface; and
   f) implement the first and second rules by associating the first program object with the first program resource to form the first program component, assigning the first program component to the first slot, displaying the template on the display, and displaying the first program object on the display at a location corresponding to the first slot.

32. The system of claim 31, wherein the software is further programmed to receive a third rule from the server defining the template and defining slots associated with the template for receiving program components, said slots comprising the first slot and a second slot.

33. The system of claim 32, wherein the software is further programmed to:
   receive a second program object from the server, said second program object having been selected from a second set of available program objects based in part upon the profile data;
   receive a second program resource from the server, said second program resource having been selected from a second set of available program resources based in part upon the profile data;
   receive a fourth rule from the server to associate the second program object with the second program resource to form a second program component;
   receive a fifth rule from the server to assign the second program component to the second slot; and
   implement the third, fourth, and fifth rules by associating the second program object with the second program resource to form the second program component, assigning the second program component to the second slot, displaying the template on the display, and displaying the second program object on the display at a location corresponding to the second slot.

34. The system of claim 32, wherein the software is further programmed to receive the first and second rules during a first session with the server, and to receive the third rule during a second session with the server, wherein the second session occurs in time before the first session.

35. The system of claim 34, wherein the software is further programmed to send the profile data to the server during the second session.

36. The system of claim 31, wherein the software is further programmed to:
   receive a second program object from the server, said second program object having been selected from a second set of available program objects based in part upon the profile data;
   receive a second program resource from the server, said second program resource having been selected from a second set of available program resources based in part upon the profile data;
   receive a third rule from the server to associate the second program object with the second program resource to form a second program component;
   receive a fourth rule from the server to assign the second program component to a second slot associated with the template; and
   implement the third and fourth rules by associating the second program object with the second program resource to form the second program component, assigning the second program component to the second slot, and displaying the second program object on the display at a location corresponding to the second slot.

37. The system of claim 31, wherein the software is further programmed to receive the first and second rules as a single rule.

38. The system of claim 31, wherein the software is further programmed to send the profile data to the server during a session established with the server.

39. The system of claim 31, wherein the first program resource is an executable computer program programmed to cycle through available customized user interfaces.

40. The system of claim 31, wherein the profile data comprises statistics regarding use of a client application associated with the local device.

41. A method of creating a customized Internet access client user interface comprising:
   selecting a first program object from a first set of available program objects based in part upon a brand name indicator associated with a local device;
   selecting a first program resource from a first set of available program resources based in part upon the brand name indicator;
   sending the first program object to an Internet access client at the local device;
   sending the first program resource to the Internet access client at the local device;
   sending a first rule to the Internet access client at the local device to associate the first program object with the first program resource to form a first program component;
   sending a second rule to the Internet access client at the local device to assign the first program component to a first slot associated with a template for an Internet access client user interface; and
   sending a third rule to the Internet access client at the local device defining the template and defining slots associated with the template for receiving program components, said slots comprising the first slot and a second slot.

42. The method of claim 41, wherein the steps of selecting the first program object and the first program resource are further based in part upon profile data associated with the local device.

* * * * *